United States Patent Office 2,861,099
Patented Nov. 18, 1958

2,861,099

METHOD OF MAKING FORMAMIDINE SULFINIC ACID

Simon Frank, Stamford, and George W. Kennerly, Darien, Conn., assignors to American Cyanamid Company, New York, N. Y., a corporation of Maine No Drawing. Application June 6, 1957
Serial No. 663,910

13 Claims. (Cl. 260—500)

This invention relates broadly to a new chemical process, and more particularly to an improved method of making formamidine sulfinic acid, which sometimes will be referred to hereinafter (for purpose of brevity) as FSA.

Formamidine sulfinic acid, also known as iminoaminomethane sulfinic acid, aminoiminomethane sulfinic acid and as thiourea dioxide, is believed to have a structure corresponding to the following formula:

I
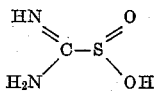

It is useful as a reducing agent, for instance in reducing vat dyes.

FSA, according to Havas (U. S. Patent No. 2,150,921, dated March 21, 1939), was first described by Barnett (J. Chem. Soc., 97, 63), who prepared it by adding powdered thiourea to a 6% aqueous solution of hydrogen peroxide; and later by Vanino and Schinner (Ber., 47, 703), who introduced thiourea into a 30% solution of hydrogen peroxide. The method disclosed in the aforementioned Havas patent involves reacting together an aqueous solution of thiourea and an aqueous solution of hydrogen peroxide, more particularly by feeding a concentrated aqueous solution of hydrogen peroxide into an aqueous solution of thiourea while maintaining the reaction mass at a temperature between 0° C. and 10° C.

Another method of making FSA, which also involves the use of aqueous hydrogen peroxide, is described in U. S. Patent No. 2,783,272, dated February 26, 1957. In this method an aqueous slurry of FSA crystals is maintained at a temperature not exceeding 10° C. and at a pH of from 2 to 6 while separately feeding to the slurry solid thiourea and aqueous hydrogen peroxide in such proportions and at such relative rates as will maintain an excess of unreacted thiourea in the slurry during substantially the entire reaction period, which excess, however, will not result, in the presence in the liquid phase of the slurry, of unreacted thiourea at a concentration in excess of 5% by weight of the liquid phase.

Processes such as those described above have the serious disadvantage that they result in excessive dilution of the reaction medium. This dilution is caused not only by the water which normally is present in a commercial solution of hydrogen peroxide but also by the water resulting from the reduction of the hydrogen peroxide. Such dilution is unavoidable, since it is inherent in the process, and complicates the recovery of FSA which is appreciably soluble in water. Consequently the yield of FSA is reduced and the cost of manufacture is increased.

The present invention is the result of our discovery that formamidine sulfinic acid can be prepared by reacting thiourea with ozone. Weyl (Chem. Ztg., 27, 292 (1901)) reported that the treatment of an aqueous solution of thiourea with ozonized air resulted in the separation of sulfur; and that the aqueous solution, after removing the sulfur, contained a large amount of sulfuric acid. Weyl gave no details of his reaction conditions.

In practicing the instant invention we bring a gas comprised of ozone, as an essential component, into intimate contact (e. g., by admixing) with a "solution" (including dispersion) of thiourea thereby to effect reaction between the ozone and the thiourea. The solution can be thiourea dissolved in water alone. Preferably the reaction conditions are correlated so as to obviate or avoid the formation of sulfur. Thereafter the desired product, formamidine sulfinic acid, is isolated from the reaction mass by any suitable means, e. g., by filtration, centrifuging, settling, etc. The process obviates or minimizes the above-described disadvantages of the prior art processes, and makes possible the production of FSA at a lower cost than heretofore has been possible.

The primary reaction between thiourea and ozone, more particularly in an aqueous medium and specifically in water, is believed to proceed essentially in accordance with the following simplified equation:

II
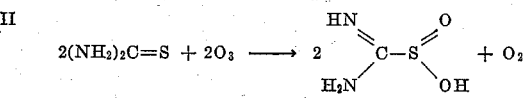

As indicated by Weyl's observations, supra, and as we also have found, other reactions can and do take place concurrently with, and/or subsequently to, the primary reaction; and the problem is, in general, to guide or control the reaction (mainly by correlation of reaction conditions) so as to obtain the maximum yield of the desired product, specifically formamidine sulfinic acid, and the minimum yield (or no production whatsoever) of an undesired product or products, e. g., sulfur.

Concerning the reaction conditions, the results of our investigations indicate, among other things, the following:

(1) The concentration of thiourea in the aqueous reaction mass is important, and, together with other reaction conditions and particularly the rate of introduction of the ozone, is critical if the formation of sulfur is to be obviated or avoided. We have observed that reaction between ozone and thiourea in water gives sulfur if the starting concentration of thiourea is too high. It is believed that this occurs because thiourea, in a high concentration in water, reacts so rapidly with ozone that the reaction mass becomes "starved" for ozone, in consequence of which an intermediate product that undoubtedly is formed breaks down to sulfur before it can be ozonized further to FSA. The optimum concentration of thiourea in the reaction mass is dependent upon other influencing conditions, for instance, the temperature and pH of the reaction mass, the rate at which the ozone is charged thereto, the rapidity of agitation of the mass, the conversion rate, liquid reaction medium, and other conditions of reaction. In general, however, it may be stated that operative conditions prevail and satisfactory yields of FSA are obtained, without the formation of any appreciable (objectionable) amount of sulfur, if any, when the concentration of thiourea in the reaction mass is within the range of from 0.1 N to 1.0 N (0.1 normal to 1.0 normal), and especially when the other reaction conditions are correlated with the concentration of thiourea in the reaction mass so as either to prevent completely the formation of sulfur or to avoid the formation of any appreciable amount of sulfur. We have obtained good results when the concentration of thiourea in the reaction mass (generally an aqueous slurry) was within the range of from about 0.25 N to 0.5 N, that is, from about 0.25 to about 0.5 mole per liter.

At concentrations of thiourea in the reaction slurry approaching, at or above about 1.0 N, the tendency to form sulfur as a by-product becomes more pronounced;

while with thiourea concentrations approaching, at or below about 0.1 N, the greater is the tendency for the ozone to attack the already-formed FSA with the result that the yield of FSA is decreased.

Since FSA is less soluble in aqueous thiourea solutions than it is in water alone, the presence of unreacted thiourea removes FSA more completely from solution, making it less available for further reaction and easier to isolate.

(2) The molar proportions of thiourea and ozone consumed in the reaction may vary considerably, e. g., from 0.8 to 1.2 moles of thiourea per mole of ozone.

(3) Decreasing the temperature of the reaction medium (or, if desired, of both the reaction medium and the ozonized gas which is charged thereto) generally results in an improvement in the yield of FSA. This is because of the fact that the lower the temperature of the reaction mass, the less soluble is FSA therein and the less susceptible it is to further oxidation by ozone. The process is operative at room temperatures, which normally range from about 20° C. to about 30° C., or a little lower or higher. Higher temperatures are not precluded, say about 40°–50° C., but are generally disadvantageous rather than advantageous for the reasons just stated. Temperatures of the reaction medium within the range of 0° C. to about 20° C. are appropriate, while a preferred range is from 0° C. to 10° C. Still lower temperatures (that is, below 0° C.) can be used, if desired, e. g., from −1° C. to about −10° C. At temperatures below 0° C. it becomes necessary to introduce an organic component, as for instance acetone, methanol, ethanol, etc., or the obvious equivalent thereof, into the reaction mass in order to depress the freezing point and thereby maintain the reaction mass in a liquid or flowable state.

The yield of FSA may be improved by employing temperatures of the reaction medium below 0° C., but whether or not the use of such temperatures is desirable is dependent upon whether or not the increase in yield is sufficient to counterbalance the additional cost incurred in using such lower temperatures.

(4) The rate of flow of the ozonized gas to the reaction zone and the agitation of the reaction mass therein should be controlled or regulated so as to provide a maximum rate of reaction of the ozone with the thiourea that is consistent with minimum decomposition of the FSA which is formed.

(5) Any gas containing or composed essentially of ozone can be used, e. g., ozonized air, ozonized oxygen, a mixture of ozone and nitrogen, etc., provided that any components in the gas other than ozone are inert (or relatively inert) toward the reactants and FSA as the reaction proceeds. The amount of ozone in the carrier gas is not critical, and may be varied as desired or as conditions may require. Generally the ozone constitutes from about 0.5% to about 10% by weight of the ozonized gas, more particularly from about 1% to about 6% by weight thereof.

(6) The pH of the reaction mass is important in minimizing side reactions, and for this reason it is desirable to correlate and control the reaction conditions so that the pH does not exceed 6. At a pH below about 2, the ozonization tends to take a different course leading to a less oxidized product which is seemingly relatively resistant to further ozonization; consequently, the yield of FSA is reduced. Good results are generally obtained when the reaction medium is maintained within a pH range of from about 3 to about 5.

(7) The process of this invention can be carried out continuously, semi-continuously or by batch technique; and at atmospheric, superatmospheric or subatmospheric pressures.

(8) The reaction is preferably carired out in a liquid medium comprised or composed of water. Other liquid media can, however, be used, e. g., acetic acid, ethyl chloride, carbon tetrachloride, fluorotrichloromethane and other liquid media known to be resistant to attack and satisfactory for use in ozonization; or, one can use dilute solutions of weak acids, e. g., a dilute solution of acetic acid, or mixtures of water and methanol, ethanol or other alcohols in any proportions. The liquid medium is preferably one which is inert during the reaction, that is, one which is inactive (non-reactive) with the reactants and with the desired product, formamidine sulfinic acid.

In order that those skilled in the art may better understand how the present invention can be carried into effect, the following examples are given by way of illustration and not by way of limitation. All percentages are by weight unless otherwise stated.

EXAMPLE 1

A reaction solution is prepared by dissolving 4.29 g. of thiourea in 50 ml. of dilute acetic acid at room temperature. Ozonized oxygen gas containing 1.9–2.0 millimoles of ozone per liter of gas is bubbled through the resulting solution at the rate of about 14 liters per hour until the absorption of ozone is essentially complete as evidenced by the presence of some unreacted ozone in the exit gases. The product, which begins to precipitate during an early stage of the reaction period, is isolated by filtration from the reaction mass, dried at room temperature and identified as pure formamidine sulfinic acid by comparing its properties (melting point and infrared spectrum) with those of an authentic sample of formamidine sulfinic acid prepared by the oxidation of thiourea with hydrogen peroxide.

EXAMPLE 2

A solution of 15.4 g. of thiourea in 200 ml. of methanol is ozonized at 0° C. by passing 46.5 liters of ozonized oxygen containing about 2 millimoles of ozone per liter through the stirred reaction solution over a period of 1½ hours. The reaction mass is filtered to separate the formamidine sulfinic acid which is formed. The product is dried at room temperature. The yield of dried product is 5.5 g.

EXAMPLE 3

The apparatus used in this example consists of a 100 ml. flask equipped with a special hollow-shafted stirrer and glass bearing through which the ozonized oxygen is admitted. The thiourea is added in the form of ⅛-inch pellets of known weight by dropping the required number of pellets through the open neck of the flask. Samples of the reaction mass are withdrawn at intervals with a micro-pipette and analyzed for thiourea spectrophotometrically.

Before starting a run the ozonator is set to a fixed output of approximately 600 cc. per minute of ozonized oxygen containing about 1 millimole of $O_3$ per liter. Analyses of the ozone "make," both before and after each run, shows that the ozone input is practically constant.

The reaction vessel, which is surrounded by an ice bath, is charged with a 0.25 N solution of thiourea in water approximately saturated with a known quantity of formamidine sulfinic acid. The solubility of FSA in 0.25 N aqueous thiourea is found to be 2.3716 g./100 ml., corresponding to 0.22 mole per liter of FSA in 0.25 N aqueous thiourea.

The ozone flow is then directed into the stirred solution and, based on the rate of ozone charged, enough thiourea pellets are added at five-minute intervals so that the thiourea concentration in the reaction mixture is maintained at about 0.25 N. A qualitative test shows that part of the ozone charged is present in the exit gases from the reaction mixture so that sufficient ozone is always available for reaction with the added thiourea.

After sampling of the reaction mixture has begun, the number of thiourea pellets added is increased or decreased depending on the changes noted in the thiourea concentration. A portion of the data taken during one run is given in Table 1.

Table 1.—Semi-continuous ozonization of thiourea

| Elapsed Time in Minutes | Thiourea Concentration in Moles/Liter | Number of Thiourea Pellets Added Every Five Minutes [1] |
|---|---|---|
| 95 | 0.205 | 10. |
| 120 | 0.227 | 10. |
| 150 | 0.262 | 0. |
| 155 |  | 5. |
| 180 | 0.311 | 0. |
| 185 |  | 0. |
| 190 |  | 5. |
| 210 | 0.279 | 5. |
| 240 | 0.242 | End of Run. |

[1] The thiourea employed has been recrystallized once from water and pelleted into 1/8-inch cylindrical pills by means of an automatic pelleting machine. Their average weight is 0.3122 g. per 10 pellets or an average of 0.4105 millimoles for each pellet.

The initial reaction mixture comprises 100 ml. of 0.245 N thiourea (24.5 millimoles) and 2.3716 g. of previously prepared formamidine sulfinic acid (21.9 millimoles). The ozonized oxygen is fed in at a rate corresponding to the introduction of about 0.85 millimole of $O_3$ per minute.

More complete data on the above run are given in Table 2.

Table 2

| Elapsed Time in Minutes | Total Thiourea Added | | Thiourea Concentration in Moles/Liter |
|---|---|---|---|
|  | Number of Pellets | Millimoles |  |
| 0 | (1 pellet=0.4105 millimoles) | | 0.245. |
| 45 | 76 | 31.7 | .0913. |
| 60 | 106 | 43.5 | .075. |
| 75 | 166 | 68.1 | .157. |
| 95 | 226 | 92.8 | .205. |
| 120 | 276 | 113.3 | .227. |
| 150 | 336 | 137.9 | .262. |
| 180 | 381 | 156.4 | .311. |
| 210 | 411 | 168.7 | .279. |
| 240 | 441 | [1] 181.0 | .242 (end of run). |

[1] The actual weight of the added pellets was 13.72 g. (180.5 millimoles).

At the end of the run the formamidine sulfinic acid is isolated by filtration of the cold reaction slurry. Upon drying at room temperature it is obtained as a white crystalline solid. The amount of dry FSA obtained from the above run is 16.18 g. (150 millimoles), and the filtrate is found to contain approximately 25 millimoles of FSA. The yield of dry FSA, based on thiourea added, is approximately 83%.

EXAMPLE 4

Essentially the same procedure is followed as described under Example 3 with the exception that the initial reaction mixture comprises 100 ml. of 0.252 N thiourea (25.2 millimoles) and 1.3054 g. of FSA (12 millimoles); also, the ozonized oxygen is fed in at a rate corresponding to the introduction of about 1.1 millimoles of $O_3$ per minute. The yield of dry FSA, based on thiourea added, is approximately 80%.

We claim:

1. The method of making formamidine sulfinic acid which comprises bringing a gas comprised of ozone, as an essential component, into intimate contact with a solution of thiourea thereby to effect reaction between the acid ozone and the said thiourea, the thiourea being present in the solution as the reaction proceeds in a concentration of from 0.1 N to 1.0 N, the molar proportions of thiourea and ozone being within the range of from 0.8 to 1.2 moles of thiourea per mole of ozone, the reaction mass being maintained at a temperature within the range of from about −10° C. to about 50° C. and within a pH range of from 2 to 6, and the rate at which the gas comprised of ozone is brought into contact with the said thiourea solution and the accompanying agitation of the reaction mass being controlled to provide a maximum rate of reaction of the ozone with the thiourea that is consistent with minimum decomposition of the formamidine sulfinic acid which is formed; and isolating formamidine sulfinic acid from the resulting reaction mass.

2. The method of making formamidine sulfinic acid which comprises bringing a gas comprised of ozone, as an essential component, into intimate contact with a solution of thiourea thereby to effect reaction between the said ozone and the said thiourea, the molar proportions of thiourea and ozone being within the range of from 0.8 to 1.2 moles of thiourea per mole of ozone, and the thiourea being present in the solution as the reaction proceeds in a concentration of from 0.1 N to 1.0 N; maintaining the reaction mass at a temperature within the range of from 0° C. to about 20° C. and within a pH range of from 2 to about 5; and isolating formamidine sulfinic acid from the resulting reaction mass.

3. The method of making formamidine sulfinic acid which comprises bringing a gas comprised of ozone, as an essential component, into intimate contact with an aqueous solution of thiourea thereby to effect reaction between the said ozone and the said thiourea, the molar proportions of thiourea and ozone being within the range of from 0.8 to 1.2 moles of thiourea per mole of ozone, and the thiourea being present in the said aqueous solution as the reaction proceeds in a concentration of from about 0.25 N to about 0.5 N; maintaining the reaction mass at a temperature within the range of from 0° C. to about 20° C. and within a pH range of from about 3 to about 5; and isolating formamidine sulfinic acid from the resulting reaction mass.

4. The method of making formamidine sulfinic acid which comprises bringing a gas containing ozone, as an essential component, into intimate contact with a solution of thiourea that is at a temperature not higher than about 30° C. thereby to effect reaction between the said ozone and the said thiourea, the molar proportions of thiourea and ozone being within the range of from 0.8 to 1.2 moles of thiourea per mole of ozone, and the thiourea being present in the solution as the reaction proceeds in a concentration within the range of from 0.1 N to 1.0 N; maintaining the reaction mass within a pH range of from 2 to 6; and isolating formamidine sulfinic acid from the resulting reaction mass.

5. A method as in claim 4 wherein the solution of thiourea is a solution of thiourea dissolved in water.

6. The method of making formamidine sulfinic acid which comprises passing a gas containing ozone, as an essential component, through an aqueous solution of thiourea that is at a temperature not higher than about 30° C. thereby to effect reaction between the said ozone and the said thiourea, the molar proportions of thiourea and ozone being within the range of from 0.8 to 1.2 moles of thiourea per mole of ozone, and the thiourea being present in the aqueous solution as the reaction proceeds in a concentration within the range of from 0.1 N to 1.0 N; maintaining the reaction mass within a pH range of from 2 to about 5; and isolating formamidine sulfinic acid from the resulting reaction mass.

7. A method as in claim 6 wherein the gas containing ozone is ozonized oxygen.

8. A method as in claim 6 wherein the aqueous solution of thiourea is a solution of thiourea in dilute aqueous acetic acid.

9. A method as in claim 6 wherein the aqueous solution of thiourea is at a temperature within the range of from about 0° C. to about 20° C.

10. A method as in claim 9 wherein the temperature is within the range of 0° C. to 10° C.

11. A method as in claim 6 wherein the range of concentration of thiourea in the reaction mass is from 0.25 N to 0.5 N.

12. The method of making formamidine sulfinic acid which comprises intimately associating ozonized oxygen and an aqueous solution containing thiourea so as to effect reaction between the ozone contained in the oxygen and the said thiourea, the molar proportions of thiourea and ozone being within the range of from 0.8 to 1.2 moles of thiourea per mole of ozone, the reaction mass being maintained within a pH range of from about 3 to about 5 and at a temperature within the range of from about 0° C. to about 10° C., the concentration of thiourea therein being within the range of from about 0.25 N to about 0.5 N, the aforementioned reaction conditions, the rate at which the ozonized oxygen is brought into intimate association with the aqueous thiourea solution, and the accompanying agitation of the reaction mass being correlated so as to avoid the formation of any appreciable amount of sulfur; and isolating formamidine sulfinic acid from the resulting reaction mass.

13. A method as in claim 12 wherein the ozonized oxygen and the aqueous solution containing thiourea are continuously intimately associated so as to continuously effect reaction between the ozone contained in the oxygen and the said thiourea, and the formamidine sulfinic acid that is formed is continuously isolated from the reaction mass.

References Cited in the file of this patent

UNITED STATES PATENTS 2,783,272     Young _____ Feb. 26, 1957

OTHER REFERENCES

Weyl: Chem. Ztg., vol. 25, Number 29, p. 292 (1901).

UNITED STATES PATENT OFFICE
CERTIFICATE OF CORRECTION

November 18, 1958

Patent No. 2,861,099

Simon Frank et al.

It is hereby certified that error appears in the printed specification of the above numbered patent requiring correction and that the said Letters Patent should read as corrected below.

Column 3, line 72, for "carired" read -- carried --; column 5, line 68, for "acid" read -- said --.

Signed and sealed this 3rd day of March 1959.

(SEAL)
Attest:

KARL H. AXLINE
Attesting Officer

ROBERT C. WATSON
Commissioner of Patents